United States Patent

[11] 3,621,102

[72] Inventors Yukio Tanaka;
 Jun Mizushina; Hitoshi Yamagishi; Hiroshi Kosaki, all of Tokyo, Japan
[21] Appl. No. 16,096
[22] Filed Mar. 3, 1970
[45] Patented Nov. 16, 1971
[73] Assignee Kokusai Electric Company Limited Tokyo, Japan
[32] Priorities Mar. 7, 1969
[33] Japan
[31] 44/16791;
 Mar. 7, 1969, Japan, No. 44/19966; Oct. 22, 1967, Japan, No. 44/83857

[54] LOW-FREQUENCY INDUCTION FURNACE
 6 Claims, 3 Drawing Figs.
[52] U.S. Cl. ............................................. 13/2, 13/26
[51] Int. Cl. ........................................... F27b 14/06, H05b 5/00
[50] Field of Search ...................................... 13/2, 5, 4, 33, 26, 27, 28, 13, 29; 266/14, 34 L, 33

[56] References Cited
 UNITED STATES PATENTS
 1,267,976  5/1918  Cobb ........................  13/13 UX
 1,639,340  8/1927  Greene .....................  13/29 X
 1,920,380  8/1933  Greene .....................  13/29 X
 2,337,072  12/1943  Tarbox .....................  13/2
 2,442,062  5/1948  Solem ......................  126/360 A
 2,725,929  12/1955  Massier ....................  175/14 UX
 3,097,252  7/1963  Robinson ..................  13/13

FOREIGN PATENTS
 438,178  11/1935  Great Britain ..........  13/2

OTHER REFERENCES
 1040717, Germany Application, Marincek, Oct. 9, 1958, (one sheet, three pages), Cl. 13, Subcl. 2.

Primary Examiner—Bernard A. Gilheany
Assistant Examiner—R. N. Envall, Jr.
Attorney—Hammond & Littell ABSTRACT: A low-frequency furnace comprising a crucible for receiving a batch of cold charge to be fused, an induction coil surrounding said crucible, a gas burner for movement into and out of said crucible and including three coaxially and peripherally spaced tubes for transporting fluids for combustion therethrough and an elevating means for said gas burner for moving the burner vertically relative to said crucible thereby to change the position of the burner relative to the surface of molten metal obtained by the fusing of said cold charge.

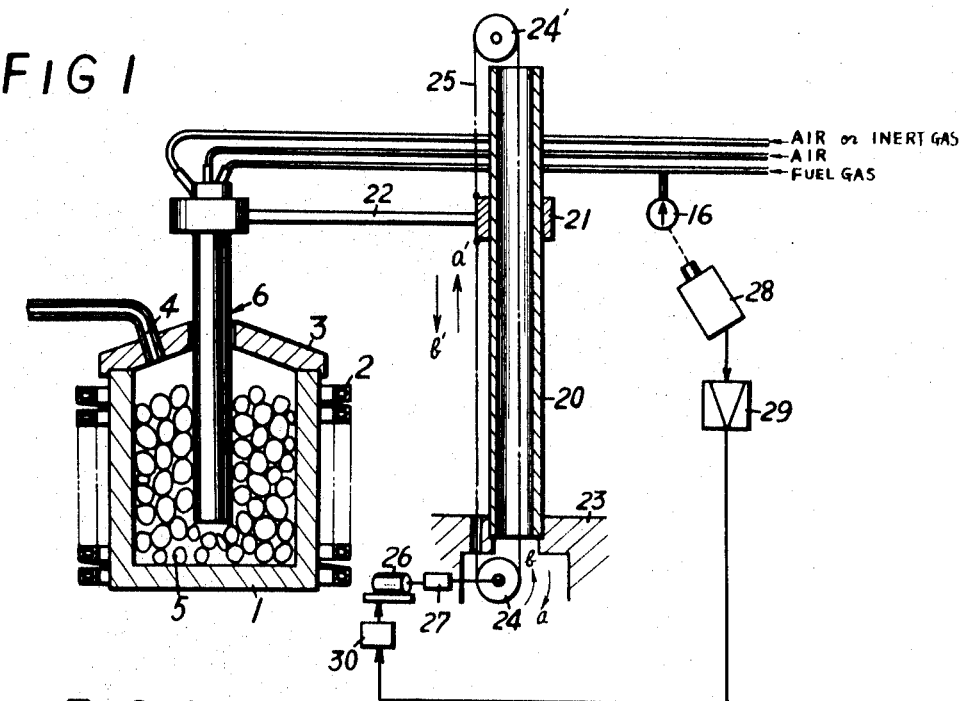
FIG 1
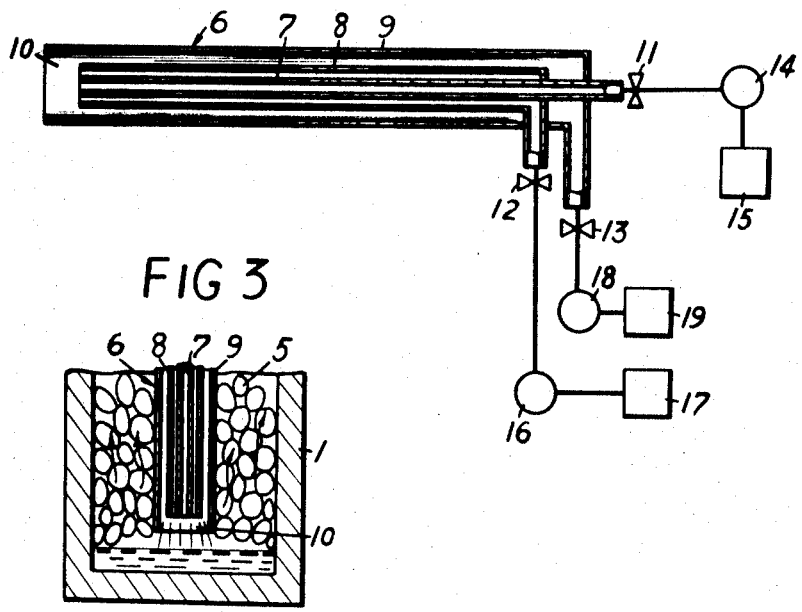
FIG 2
FIG 3

LOW-FREQUENCY INDUCTION FURNACE

BACKGROUND OF THE INVENTION

There have been proposed a variety of low-frequency induction furnaces for fusing metal and in the conventional induction furnaces, it has been generally known that even if a batch of cold charge thrown in the crucible of the furnace is fused only by induction fusing an initial stage of the fusing process cannot be efficiently and economically conducted because of waste in power and time. In order to overcome the difficulty it has been generally followed that a certain amount of metal material is preliminarily fused by a gas burner which is separate from an induction furnace to produce an initial amount of molten metal, the thus obtained molten metal is thrown into the crucible of the furnace together with a batch of cold metal lump and then an induction coil disposed around the furnace is supplied with power to cause the induction action of the molten metal to fuse the cold metal lump successively. However, such a conventional process requires rather complicated procedures prior to the operation of the furnace for a proper fusing process and the cost required for the electric system for the furnace is great. Therefore, the furnace cannot be economically operated.

SUMMARY OF THE INVENTION

The present invention relates to a low-frequency induction furnace and more particularly, to a low-frequency induction furnace which is employed in combination with a gas burner.

One principal object of the present invention is to provide a low-frequency induction furnace in which cold charge can be initially fused within the crucible of the furnace.

The above object can be attained by using an induction furnace in combination with a gas burner which is used for fusing a batch of cold charge thrown in the crucible of the furnace.

Another object of the present invention is to provide and induction furnace of the above type which can be economically operated by fusing a batch of cold charge thrown in the crucible of the furnace by both an induction fusing action and a gas fusing action with a gas burner maintained in its ignited state throughout a cycle of operation on the furnace.

Since energy from an induction furnace is generally very expensive, such a combination use of a gas burner together with the furnace can substantially reduce the overall energy cost. The object can be attained by fusing cold charge principally with gas flames from the gas burner and controlling decrease in the temperature of molten metal and maintaining the molten metal at a predetermined temperature with induction fusing action.

According to the present invention, in operation the gas burner is disposed vertically within the crucible of the furnace and since the surface of molten metal rises gradually as the fusing process progresses, the burner should be raised gradually as the molten metal surface rises gradually.

Therefore, a further object of the present invention is to arrange the gas burner in such a manner that the burner may be vertically moved within the crucible so as to maintain the burner in a proper position with respect to the surface of the molten metal.

A further object of the present invention is to provide an induction furnace of the above type in which the gas burner is so mounted that the gas burner is gradually and automatically raised as the surface of the molten metal rises thereby to always maintain the lower end of the burner at a proper spaced distance from the surface of the molten metal.

A further object of the present invention is to provide an induction furnace of the above type in which a hot gas flow from the gas burner preheats any nonmelted portion of metal charge as the flow passes upwardly within the crucible thereby to fuse the metal mass more effectively.

Other objects of the present invention will be readily understood from a reading of the following detailed description of the invention.

According to one aspect of the present invention, there has been provided a low-frequency induction furnace which comprises a crucible for receiving a batch of cold charge to be fused therein and an induction coil disposed around said crucible in a surrounding relation thereto, characterized in that a gas burner disposed for vertical movement into and out of said crucible and an elevating means disposed outside of said crucible for said burner as the surface of molten metal within the crucible rises.

The gas burner suitably employed in the present invention comprises a first or innermost tube through which air or oxygen is transported, a second or intermediate tube coaxially surrounding said first tube in a peripherally spaced relation thereto and for transporting fuel gas, and a third or outermost tube coaxially surrounding said second tube in a peripherally spaced relation thereto for transporting air or oxygen therethrough. The ends of the first and second tubes terminate short of the adjacent end of the third tube thereby to define a combustion chamber adjacent to and inwardly of the adjacent end of the third tube.

Air or oxygen passing through the first tube and fuel gas passing through the second tube are mixed together in the above-mentioned combustion chamber and air passing through the third tube assists perfect combustion of gas flames from the mixture and also serves to provide an air curtain which surrounds the gas flames so as to effectively direct the flames downwardly.

The above and other objects and attendant advantages of the present invention will be more readily apparent to those skilled in the art from a reading of the following detailed description in conjunction with the accompanying drawing.

BRIEF DESCRIPTION OF THE DRAWING

FIG. 1 is a schematic diagram of one preferred form of low-frequency induction furnace which incorporates a gas burner system therein embodying the present invention;

FIG. 2 is a further enlarged fragmentary view showing said gas burner in a longitudinal section and its associated gas supply system schematically as shown in FIG. 1; and FIG. 3 is an enlarged vertically sectional view of the lower portion of said crucible and the lower end of said gas burner as shown in FIG. 1 which shows the position of said lower end of the gas burner relative to the surface of molten metal in the crucible at a particular stage during the operation of said furnace.

EMBODIMENTS OF THE INVENTION

Referring to the accompanying drawing and more particularly, to FIG. 1 thereof, the induction furnace of the invention generally comprises a crucible 1 and an induction coil 2 disposed around the crucible in a surrounding relation thereto. The crucible 1 comprises a conventional container having refractory and heat-resisting properties. The crucible 1 has a top opening which is covered with a removable top cover 3 which has a gas exhaust port 4 therein. The induction coil 2 comprises a coiled tube having a passage for circulating cooling water in the hollow interior. The crucible 1 and induction coil 2 constitute a conventional coreless-type induction furnace. A batch of cold charge 5 is thrown into the crucible 1 in any suitable manner after the cover 3 has been removed from the furnace. The cold charge 5 may be cast iron or scrap, for example. The induction coil 2 is supplied with a low or commercial frequency electric power from a suitable power supply source (not shown).

The induction furnace of the invention further comprises a gas burner 6 and as more clearly shown in FIG. 2, the gas burner comprises a first or innermost tube 7 through which air or oxygen is to be transported, a second or intermediate tube 8 through which fuel gas such as propane gas is to be transported and a third or outermost tube 9 through which air or inert gas such as $N_2$ is to be transported. The second tube 8 is coaxially disposed around the first tube 7 in a peripherally spaced relation thereto and the third tube 9 is coaxially disposed around the second tube 8 in a peripherally spaced relation thereto. One or the lower ends of the first and second tubes 7 and 8 terminate short of the adjacent or lower end of the third tube 9 thereby to define a combustion chamber 10 adjacent to and inwardly of the lower end of the third tube. These tubes may be made of a metal such as stainless steel or any other suitable material. The inlet or upper ends of these tubes 7, 8 and 9 are respectively connected to the outlets of valves 11, 12 and 13, respectively. The inlet of the valve 11 is connected through a pressure gauge or flowmeter 14 to a compressor or oxygen bomb 15 which is adapted to provide air or oxygen under pressure. The inlet of the valve 12 is connected through a pressure gauge or flowmeter 16 to a bomb 17 which is filled with fuel such as liquefied propane gas (LPG). The inlet of the valve 13 is connected through a pressure gauge or flowmeter 18 to an air compressor 19. When inert gas is to be transported through the outermost tube 9, the air compressor 19 may be replaced by a liquefied gas bomb.

The fuel from the fuel bomb is vaporized by an evaporator (not shown) as the fuel is passed through its passage. Such an evaporator is preferably provided adjacent to the crucible 1 so that the head loss of the fuel gas may be minimized. Since a substantial amount of air is required for the combustion of LPG, the distance from the compressor 15 to the air tube 7 is preferably made short as much as possible so that the head loss of air may be minimized.

In operation, the burner 6 is vertically lowered down into the crucible 1 with the cover 3 removed therefrom until the lower end of the burner reaches to a desired position spaced from the bottom of the crucible and then a batch of cold charge 5 is thrown into the crucible at the top thereof and then the cover is mounted on the top of the furnace. Then, the gas burner is ignited to preliminarily fuse the cold charge within the crucible 1 with the flames from the burner to provide an initial amount of molten metal. It takes about 30 minutes to preliminarily fuse cold charge in a 1-ton furnace. Following the preliminary fusing by the gas burner, the induction coil on the furnace is supplied with power to initiate a principal fusing operation on the furnace while maintaining the gas burner in its ignited condition. During the operation of the gas burner, the air from the first tube 7 and the fuel from the second tube 8 are mixed together and burned in the combustion chamber 10 and the gas flames from the combustion of the mixture are supplemented with air from an air curtain which is formed within the combustion chamber 10 by the air passing through the third tube 9 thereby to insure a perfect combustion of the mixture and thus, the gas flames are elongated downwardly while being surrounded by the air curtain. Therefore, the temperature of the gas flames can be increased and heat can be effectively infiltrated into the material whereby the cold charge can be effectively and sufficiently heated to provide an initial amount of molten metal. And since the gas flames also serve to preheat the cold charge as they go upwardly through gaps in the cold charge 5, the heat energy from the flames can be effectively utilized (see FIG. 3). The burner continues its operation until the cold charge will be preliminarily fused to a predetermined molten state in which the induction fusing by the induction coil can be effectively conducted whereupon the burner may be extinguished so that the following principal fusing operation may be effected by the induction fusing. Since the time required to fuse a particular cold charge to a desired preliminarily molten state through only the induction fusing substantially corresponds to that required to perfectly fuse the preliminarily molten charge to a molten state ready for pouring out thereof, the use of the above-mentioned burner for the preliminary fusing operation on cold charge will serve to substantially reduce the overall time required for operating the furnace in a particular fusing operation.

However, it has been found that if the burner is allowed to be ignited until the whole cold charge will be perfectly fused the fusing operation will be more effectively and advantageously performed. In such a case, cold charge is principally fused by the gas flames from the burner and the preliminarily fused charge is further fused to a perfectly molten state whereby the temperature of the preliminarily molten material may be prevented from decreasing and maintained at a predetermined valve. Thus, according to the present invention, when the gas burner and induction coil are concurrently operated until a desired amount of molten metal will be obtained, the ratio of fuel gas consumption to electric power consumption is preferably made great as much as possible within a range in which any drop in the temperature of the molten metal can be avoided. In this way, operation time, energy consumption and investment cost necessary for obtaining a particular amount of molten metal at a particular temperature can be substantially reduced as compared with those required for any conventional induction furnace under the identical conditions.

To discuss an instance in which a 1-ton induction furnace is operated for fusing cast iron as a cold charge, when gas flames were provided using LPG at the rate of 36.5 kg./hr. and at the same time electric power was supplied to the induction coil at the rate of about 280 kw./hr., 1 ton of molten iron at 1,250° C. was obtained per hour. The gas burner employed in this instance, the inner diameter of the first tube 7 was set as 25 mm., that of the second tube 8 was set as 35 mm. and that of the third tube 9 was set as 43 mm. Since the conventional 1-ton induction furnace was designed to be operated for only induction fusing, even if the furnace was operated over the time interval of 1.85 hours consuming 640 kw. of electric power, only 0.54 ton of molten metal was obtained. Thus, according to the present invention, the time, energy cost and investment cost required for fusing a particular bath of cold charge can be substantially reduced as compared with the corresponding induction furnace employed for the same operation. Furthermore, when the conventional induction furnace is continuously operated for a cycle of processes the whole of a batch of molten metal is not discharged out of the crucible after a batch of cold charge has been fused, but a substantial amount of the molten metal should be retained in the crucible to be used in the next process in the cycle operation and accordingly, the amount of molten metal to be discharged per process is small. On the contrary, according to the present invention it is not required to retain any portion of a particular batch of molten metal in the crucible after one process and accordingly, the amount of molten metal to be discharged per process will be increased. When calculated based on the above-mentioned 1-ton furnace, according to the present invention it has been found that investment cost, energy cost and fusing time are reduced about 20 percent, about 20–30 percent and about 30–40 percent, respectively, as compared with those required for the corresponding conventional induction furnace.

In order that the lower end of the burner may be at all the times maintained at a predetermined distance from the surface of the molten metal within the crucible 1, according to the present invention there is provided an automatic elevating means which is adapted to automatically raise the burner as the surface of the molten metal rises up (see FIG. 1). This means is disposed out of the crucible 1 and comprises a cylindrical guide 20 which has the longitudinal axis parallel to that of the crucible, a sliding collar member 21 mounted on the guide for slidable movement along the length of the latter and an arm 22 extending horizontally from the outer periphery of the collar member 21. The guide 20 is fixedly secured at the lower end to a base structure 23. The free end of the horizontal arm 22 has the upper end of the burner 6 secured thereto. The elevating means further includes a pair of sprockets 24 and 24' which are rotatably mounted by any suitable means (not shown) adjacent to the lower and upper ends of the guide 20, respectively. A chain 25 is trained over the sprockets 24 and 24' and the chain is adapted to be guided around the sprocket 24, through the interior of the guide 20, around the sprocket 24' and then along the outside of the guide. The opposite ends of the chain 25 are fixedly secured to the sliding member 21. The sprocket 24 is connected to the output shaft of a reduction gear 27 which is in turn connected to a motor 26. Therefore, when the motor 26 is rotated in one or the other direction, the rotational movement of the motor imparts rotation to the sprocket 24 in the arrow *a* or *b* direction through the reduction gear 27 which in turn drives the chain 25 in the arrow *a'* or *b'* direction. The movement of the chain 25 moves the sliding member 21, arm 22 and gas burner 6 in unison upwardly or downwardly. The chain 25 may be replaced by a belt, cable or any other suitable strand. The sprockets 24 and 24' may be also replaced by any other suitable rotatable members against which a particular strand may engage depending upon the type of the strand employed.

The elevating means further includes a pressure detector which is adapted to detect any gas pressure within the second or fuel tube 8 and the above-mentioned pressure gauge 16 may be employed as the pressure detector. When the surface of the molten metal has approached to a position only several centimeters spaced from the lower end of the burner 6 as the surface of the metal rises up gradually, the surface of the molten metal tends to move oscillatorily which causes the pressure of the gas spouting from the burner to vary to the extent that the pointer of the pressure gauge is caused to wander. For the purpose of converting such oscillation of the pointer of the pressure gauge into an electric signal, according to the present invention there is provided a photoelectric transducer 28 which may be in the form of a phototransistor, for example. Any oscillation of the pointer of the pressure gauge is detected by the phototransistor which will then convert the detected oscillation of the pointer into an oscillatory signal. The signal is then fed to an amplifier 29 wherein the signal is amplified and the amplified signal is employed to excite a relay 30 which will close a switch inserted in the motor-exciting circuit. When the relay 30 is excited, the motor 26 is rotated in the normal direction thereby to move the gas burner upwardly. When the lower end of the gas burner 6 has reached a position about 10 cm. above the surface of the molten metal within the crucible 1, the degree at which the fuel gas responses to the motion of the molten metal surface will be decreased and therefore, the oscillation of the pointer due to oscillatory variation in the pressure of the fuel gas will diminish. Thus, the valve of the oscillating current provided in the phototransistor will be insufficient to excite the relay 30. As a result, the rotation of the motor in the normal direction comes to cease and the vertical movement of the gas burner also comes to cease. When the oscillation of the pointer of the pressure gauge exceeds a predetermined range again as the surface of the molten metal rises gradually, the gas burner will initiate its upward movement again in the manner as mentioned hereinabove. In this way, the gas burner continues its intermittent upward movement until the whole of a particular cold charge has been perfectly fused.

The motor-exciting circuit includes a switching means which rotates the motor in the reverse direction so that the gas burner may be lowered into the crucible 1 before the furnace will be operated for a process on a particular batch of material.

In an alternative manner of operation using the furnace of the invention, cast iron charged in the crucible 1 is initially fused by a combined gas flame fusing and induction fusing until a predetermined amount of molten metal at 1,250° C. will be produced and then the molten metal is further heated to 1,450 C., for example, by only the induction fusing. Increase in the temperature of the molten metal from 1,250° to 1,450° C. can be effected consuming about 120 kw. over the time interval of about 20 minutes. An electric system which may be employed in the alternative operation may be of a system having the continuous rating of 280 kw. (based on a 1-ton furnace). On the other hand, in the conventional operation on a 1-ton furnace, the continuous rating of 360 kw. was required. Therefore, according to the present invention, the electric system to be employed may be smaller than that required in the conventional induction furnace having the corresponding capacity.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

What is claimed is:

1. In a low-frequency induction furnace comprising a crucible for receiving a batch of cold charge to be fused, an induction coil disposed around said crucible, a gas burner mounted for vertical movement into and out of said crucible and elevating means for moving said gas burner vertically, the improvement which consists in that said elevating means for the gas burner comprise a vertical cylindrical guide having its longitudinal axis parallel to that of said crucible, a sliding member mounted on the outer periphery of said guide for slidable movement along the length of the guide, an arm extending horizontally from the outer periphery of said sliding member and supporting said gas burner at the free and, an endless ribbon member passing outside of said guide adjacent to the outer surface of the guide along the axis of the latter and secured to said sliding member, a pair of rotary members positioned adjacent to the opposite ends of said guide for engaging said ribbon member and a motor for rotating said rotary members.

2. A low-frequency furnace according to claim 1, in which said elevating means further include a pressure detector for detecting the pressure of fuel gas passing through said second tube and means for converting any variation in pressure detected by said detector into an electric oscillation, the output of said converting means actuating said motor.

3. A low frequency furnace according to claim 2, in which said detector is a pressure gauge and said converting means is a photoelectric transducer.

4. A low-frequency furnace comprising a crucible for receiving a batch of cold charge to be fused and an induction coil disposed around said crucible in a surrounding relation thereto, characterized in that a vertically movable gas burner for fusing said cold charge within the crucible and including a first or innermost tube through which air or oxygen is transported, a second or intermediate tube through which fuel gas is transported and a third or outermost tube through which air or inert gas is transported to form a curtain of said air or inert gas, said three tubes being arranged in a coaxially and peripherally spaced relation to define fluid passages between adjacent tubes and one ends of said first and second tubes terminating short of the adjacent end of said third tube thereby to define a combustion chamber adjacent to and inwardly of said adjacent end of the third tube; and an automatic elevating means for moving said gas burner vertically including a vertical cylindrical guide disposed outside of said crucible and having the axis parallel to the axis of the crucible, a sliding member mounted on said guide for slidable movement along the guide, an arm extending horizontally from the outer periphery of said sliding member and supporting said gas burner at the free end, a strand member having a portion secured to said sliding member and moving longitudinally along the outer surface of said guide, rotary members disposed adjacent to the opposite ends of said guide and by which said strand is engaged, a motor for rotating said rotary members, a detector for detecting the pressure of fuel gas passing through said second tube of the burner and means for converting any variation in pressure detected by said detector into an electrical oscillation which excites said motor.

5. In a process for fusing a cold charge of metal in the crucible of a low-frequency induction furnace which comprises the steps of fusing a predetermined portion of said cold charge with heat generated by a burning gas burner, continuing to fuse said charge with heat generated by an alternating electrical induction current, and gradually raising the vertical level of burning gas at a rate corresponding to the rising level of molten metal as the fusion progresses, the improvement which consists of continuously detecting variations in the pressure of burning gas against the rising surface of molten metal, converting said pressure variations into electrical impulses, converting said electrical impulses into an upwardly directed mechanical force, and applying said mechanical force to said gas burner to raise the level of burning gas.

6. The process according to claim 5 wherein said pressure variations are detected by a pressure gauge and said variations are converted into electrical impulses by a phototransistor.

* * * * *

PO-1050
(5/69)

UNITED STATES PATENT OFFICE
CERTIFICATE OF CORRECTION

Patent No. 3,621,102          Dated November 16, 1971

Inventor(s) YUKIO TANAKA, JUN MIZUSHINA, HITOSHI YAMAGISHI and HIROSHI KOSAKI

It is certified that error appears in the above-identified patent and that said Letters Patent are hereby corrected as shown below:

[31]      "1967" should read --1969--.

Col. 5, line 42 -   "valve" should read --value--.

Signed and sealed this 23rd day of May 1972.

(SEAL)
Attest:

EDWARD M. FLETCHER, JR.                ROBERT GOTTSCHALK
Attesting Officer                      Commissioner of Patents